United States Patent Office 3,216,963
Patented Nov. 9, 1965

3,216,963
NYLON POLYMER SOLUTIONS
Edward S. Wheeler, Ambler, and Charles A. Signorino, Bridgeport, Pa., assignors to The Atlantic Refining Company, Philadelphia, Pa., a corporation of Pennsylvania
No Drawing. Filed Jan. 2, 1962, Ser. No. 163,848
3 Claims. (Cl. 260—30.4)

This invention relates to a nylon solvent and a method of making the same. More particularly, this invention relates to a nylon solvent prepared by reacting a dimethyl-meta-dioxane with formaldehyde or substances yielding formaldehyde in the absence of a catalyst.

"Nylon" is a generic term for any long chain synthetic polymeric amide which has recurring amide groups as an integral part of the main polymer chain and which is capable of being formed into a filament in which the structural elements are oriented in the direction of the axis. (See Chemistry of Commercial Plastics by R. L. Wakeman, Rheinhold Publishing Company, 1947.)

A great number of different types of nylon are known, however, only a limited number have achieved commercial acceptance. These include polymers prepared from (1) Hexamethylene diamine and adipic acid (polyhexamethylene adipamide),
(2) Epsilon-caprolactam (polyepsilon caprolactam),
(3) Hexamethylene diamine and sebacic acid (polyhexamethylene sebacamide),
(4) Hexamethylene diamine, epsilon-caprolactam, adipic acid and sebacic acid (copolymer) (polyhexamethylene adipamide-sebacamide),
(5) Hexamethylene diamine and adipic acid modified with formaldehyde and methanol.

These nylons provide a range of polymer types which vary greatly in their properties and utilities. They range from liquids to high-melting crystalline solids and find use as fibers, filaments, films, extrusions, moldings, castings, adhesives, surface coatings, modifiers, and lacquers.

Even though nylon polymers have many advantages and are extremely versatile in certain of their applications, an important characteristic of nylon is its inherent chemical inertness and its insolubility in most solvent materials. While it is true that chemical inertness and insolubility of nylon are desirable properties in certain instances, there are many uses to which nylon could be applied if it could be dissolved in quantity in a suitable solvent. For example, if solutions of nylon could be produced, it would then be possible to "wet spin" the nylon into fibers and filaments more economically; it would be possible to produce a powdered nylon more economically; and there would be a more widespread use of nylon lacquers.

At the present time, nylon is considered soluble in only a few solvents such as phenol, cresols, and dimethyl formamide (DMF). Nylon in general is scarely attacked by other solvents and is soluble only to the extent of about one percent by weight in materials such as crotyl phenol, secamyl phenol, o-allylphenol, glycerol mono- and di-chlorohydrin, ethylene bromo- and chlorohydrin, acetic acid, lactic acid, thioglycolic acid, 2,3-dibromopropane and phenylethyl alcohol.

Even with those materials in which nylon is considered soluble (i.e., phenol, cresols, and DMF), it is possible to form difficult workable solutions of only about 30 percent by weight nylon in DMF and about 20 percent by weight nylon in phenol and cresols. In forming solutions of nylon in these solvents, relatively high temperatures must be used and, if temperatures above the softening or melting point of the nylon are used, it tends to break down and discolor unless the solubilizing procedure is conducted in an atmosphere of an inert gas. In addition, at temperatures above its softening points, nylon exhibits poor workability and offers extreme resistance to processing on conventional equipment such as roll mills, calenders, Banbury mixers, extruders, etc. As a result, even the few compounds which are compatible with nylon, in general, do not markedly improve the workability of the nylon.

In addition to the limited solubility of nylon in known solvents therefor, (i.e., phenol, cresols, and DMF), these solvents possess other properties which make them undesirable materials to be used in certain phases of the processing of nylon. For example, DMF is toxic and has an objectionable odor, and phenol and cresols are not only toxic and odoriferous, but also are extremely corrosive. Obviously a material which is non-corrosive, relatively odorless, and is a solvent for substantial amounts of nylon would be extremely desirable.

It has now been found that the reaction product of a dimethyl-meta-dioxane selected from the group consisting of 4,4-dimethyl-meta-dioxane and 4,5-dimethyl-meta-dioxane and an aldehyde selected from the group consisting of formaldehyde and substances yielding formaldehyde is an excellent solvent for nylon.

It is, therefore, an object of this invention to provide a novel nylon solvent.

It is another object of this invention to provide a method for preparing a nylon solvent.

Other objects of this invention will become apparent to those skilled in the art from the following description.

It is well-known that meta-dioxanes may be produced by reacting an olefin hydrocarbon with an aldehyde in the presence of an acid catalyst. The type of compound produced depends upon the olefin, aldehyde and catalyst used as well as on the reaction temperature. Although various acidic catalysts, such as mineral acids, phosphotungstic acid and zinc chloride may be used, it is generally preferred to utilize sulfuric acid as the catalyst. Concentrations of this acid may vary from 2 to 85 weight percent depending on the type of olefin feed, and reaction temperatures may range from 5° C. to 150° C. and higher. Thus, isobutylene may be reacted with formaldehyde or substances yielding formaldehyde, at temperatures preferably between 40° C. to 70° C. in the presence of an aqueous sulfuric acid catalyst of about 10 to 40 weight percent concentration, preferably about 25 weight percent concentration, to form 4,4-dimethyl-meta-dioxane. Butene-2 may be similarly reacted with formaldehyde or paraformaldehyde in the presence of a sulfuric acid catalyst of about 40 to 60 weight percent concentration to form 4,5-dimethyl-meta-dioxane.

It is also known that a normally gaseous hydrocarbon stream containing a mixture of $C_4$ paraffins and olefins, including isobutylene and butene-2, as well as some $C_3$ and $C_5$ paraffins and olefins, will react with formaldehyde or substances yielding formaldehyde at temperatures preferably between 40° C. to 70° C. in the presence of an aqueous sulfuric acid catalyst to form 4,4-dimethyl-meta-dioxane and 4,5-dimethyl-meta-dioxane. If it is desired to react predominantly the isobutylene in such a stream, relatively dilute concentrations of sulfuric acid catalyst, preferably about 25 weight percent, are used in which case 4,4-dimethyl-meta-dioxane will be produced predominantly along with a small amount of 4,5-dimethyl-meta-dioxane from the reaction of butene-2. As the acid concentration is increased, the conversion of butene-2 increases, with acid concentrations of greater than about 40 weight percent resulting in essentially complete conversion of butene-2.

In accordance with the instant invention a nylon solvent may be prepared by heating either 4,4-dimethylmeta-dioxane or 4,5-dimethyl-meta-dioxane or mixtures thereof with formaldehyde or a substance yielding formaldehyde in the presence of water at a temperature of from 190° C. to 215° C. and an autogenous pressure of from 250 p.s.i.g. to 450 p.s.i.g. for a period of time ranging between about 10 minutes and 1 hour, and thereafter distilling the reaction mixture and recovering a product boiling between 80° C. and 150° C. at 10 millimeters of mercury pressure. The preferred temperature and pressure ranges are 200° C. to 205° C. and 350 p.s.i.g. to 400 p.s.i.g., respectively.

No specific molar ratios of reactants are needed to produce the novel nylon solvents of this invention. It has been found that any molar ratios of reactants will, upon distillation of the product produce a certain yield of material boiling between 80° C. and 150° C. at 10 mm. of mercury pressure. For maximum yields of product, it is preferred that the molar ratio of dimethyl-meta-dioxane to formaldehyde be in the range of 1:2 to 1:3 and the molar ratio of water to dimethyl-meta-dioxane be in the range of 14:1 to 18:1.

No catalyst is used in the process of this invention since it has been found that if a basic catalyst is present, undesirable polymeric materials are formed which have no value as a nylon solvent and, if an acidic catalyst is present, decomposition products are produced which also have no value as a nylon solvent.

It is not known what chemical compound or compounds are produced by the process of this invention. Since the nylon solvent product has such a wide boiling range (i.e., 80° C. to 150° C. at 10 millimeters of mercury pressure) it is apparent that it is a mixture of two or more separate compounds. While each of the compounds individually may not be a suitable nylon solvent, apparently a synergistic effect takes place between them which enables the mixture to be an excellent nylon solvent. For example, it has been found that it is possible to dissolve up to 50 percent by weight nylon in the reaction product of this invention and retain a solution having a workable viscosity.

In addition to its excellent solubilizing property, the nylon solvent of this invention has additional advantages over conventional nylon solvents such as dimethyl formamide and cresols. Comparative data showing these advantages are presented in Table I.

TABLE I

|  | Nylon Solvent of this invention | Dimethyl formamide | Cresols |
|---|---|---|---|
| Boiling range | 80° C.–150° C. (at 10 mm. mercury pressure). | 153 | 191–204. |
| Wt. percent nylon soluble.[1] | ~50 | ~30 | ~20. |
| Corrosivity | None observed | Slightly corrosive. | Corrosive. |
| Odor | Slight, nonobjectionable at 150° C. | Strong at room temperature. | Strong at room temperature. |

[1] Solutions of workable viscosity.

In Table I it is clearly shown that the physical properties of the instant nylon solvent with respect to corrosivity, and odor are far superior to those possessed by both dimethyl formamide and cresols. It is also shown that it is possible to dissolve more than twice as much nylon in the instant materials as in cresols, and more than one and one-half times as much nylon as in dimethyl formamide and still retain a solution of workable viscosity.

The following examples serve to further illustrate the instant invention.

*Example I*

To a mixture of 2.0 moles isobutylene and 5.0 moles formaldehyde there was added 150 gm. concentrated sulfuric acid and 450 gm. water. The mixture was heated at 140° C. in a sealed container for 30 minutes. There was recovered by distillation 195.2 gm. of 4,4-dimethyl-meta-dioxane boiling at 132° C. to 133.5° C. (B.P. 133° C. at 760 mm. mercury pressure, Chemical Reviews, vol. 51, p. 517).

*Example II*

To a mixture of 18 gm. formaldehyde and 132 gm. water contained in an autoclave, there was added 50 gm. 4,4-dimethyl-meta-dioxane produced in Example I. The reaction mixture was heated at 215° C. for 17 minutes. An autogenous pressure of about 420 p.s.i.g. was developed. A product boiling between 80° C. and 150° C. at 10 mm. of mercury pressure was recovered in a yield of 62 percent.

*Example III*

To a mixture of 25 gm. formaldehyde and 125 gm. water contained in an autoclave, there was added 50 gm. 4,4-dimethyl-meta-dioxane produced in Example I. The reaction mixture was heated at 200° C. for 30 minutes. An autogenous pressure of about 360 p.s.i.g. was developed. A product boiling between 80° C. and 150° C. at 10 mm. of mercury pressure was recovered in a yield of 85 percent.

*Example IV*

To five separate portions of the reaction product produced in Example II, there was added 2, 5, 10, 20 and 50 weight percent nylon, respectively. The nylon was polyhexamethylene adipamide (polymer derived from hexamethylene diamine and adipic acid) which had a melting point of 263° C. No noticeable solubilizing of the nylon was observed at room temperature, however, as the temperature was raised to about 120° C. to 130° C. the nylon began to dissolve and was completely dissolved at a temperature of about 150° C. to 180° C. as evidenced by a clear fluid solution. As the samples were slowly cooled to room temperature, the more concentrated solutions gelled or solidified forming translucent solids whereas the less concentrated solutions remained clear and fluid even at ambient temperatures.

Similar results were noted when using polyepsilon caprolactam having a melting point of 220° C.

We claim:
1. A homogenous composition comprising
    (a) A solvent prepared by reacting at least one dimethyl-meta-dioxane selected from the group consisting of 4,4-dimethyl-meta-dioxane and 4,5-dimethyl-meta-dioxane with formaldehyde in the presence of water at a temperature of from 190° C. to 215° C. and an autogenous pressure of from 250 p.s.i.g. to 450 p.s.i.g. for a period of time ranging between 10 minutes and one hour, distilling the reaction mixture and recovering the fraction boiling between 80° C. and 150° C. at 10 mm. of mercury pressure.
    (b) A long chain synthetic polymeric amide which has reoccurring amide groups as an integral part of the main polymer chain and which is capable of being formed into a filament in which the structural elements are oriented in the direction of the axis, said polymeric amide being present in an amount ranging up to 50 weight percent of said solvent.
2. A homogenous composition according to claim 1 wherein the dimethyl-meta-dioxane is 4,4-dimethyl-meta-dioxane.
3. A homogenous composition according to claim 1 wherein the dimethyl-meta-dioxane is 4,5-dimethyl-meta-dioxane.

(References on following page)

References Cited by the Examiner

UNITED STATES PATENTS

| | | | |
|---|---|---|---|
| 2,841,568 | 7/58 | Craig et al. | 260—30.4 |
| 2,856,412 | 10/58 | Wheeler | 260—340.7 |
| 2,962,507 | 11/60 | Hellin et al. | 260—340.7 |
| 2,997,480 | 8/61 | Hellin et al. | 260—340.7 |
| 3,000,905 | 9/61 | Wheeler et al. | 260—340.7 |
| 3,011,989 | 12/61 | Russell | 260—30.4 |
| 3,036,090 | 5/62 | Wheeler et al. | 260—340.7 |
| 3,054,803 | 9/62 | Robeson et al. | 260—340.7 |
| 3,057,877 | 10/62 | Klein | 260—340.7 |
| 3,062,835 | 11/62 | Signorino | 260—340.7 |
| 3,080,378 | 3/63 | Munley et al. | 260—340.7 |

FOREIGN PATENTS 1,248,687  11/60  France.

MORRIS LIEBMAN, *Primary Examiner.*

LEON J. BERCOVITZ, *Examiner.*